United States Patent [19]

Kurokawa et al.

[11] Patent Number: 4,879,041

[45] Date of Patent: Nov. 7, 1989

[54] PROCESS FOR PRODUCING ULTRA-PURE WATER AND PROCESS FOR USING SAID ULTRA-PURE WATER

[75] Inventors: Hideaki Kurokawa; Akira Yamada, both of Hitachi; Yasuo Koseki, Hitachiota; Harumi Matsuzaki, Hitachi; Katsuya Ebara, Mito; Sankichi Takahashi, Hitachi; Hiroaki Yoda, Ibaraki; Nobuatsu Hayashi, Abiko; Isao Okouchi, Hitachi; Yukio Hishinuma, Hitachi; Naohiro Momma, Hitachi, all of Japan

[73] Assignee: Hitachi, Ltd., Tokyo, Japan

[21] Appl. No.: 172,583

[22] Filed: Mar. 24, 1988

[30] Foreign Application Priority Data

| Mar. 25, 1987 | [JP] | Japan | 62-68893 |
| Jun. 5, 1987 | [JP] | Japan | 62-139782 |
| Aug. 14, 1987 | [JP] | Japan | 62-201718 |
| Aug. 24, 1987 | [JP] | Japan | 62-209989 |
| Sep. 17, 1987 | [JP] | Japan | 62-233399 |

[51] Int. Cl.$^4$ .............................. B01D 13/00
[52] U.S. Cl. ........................ 210/640; 55/158
[58] Field of Search ............ 55/158; 202/200; 159/DIG. 27; 20/640, 192; 203/DIG. 17, DIG. 24, DIG. 11

[56] References Cited

U.S. PATENT DOCUMENTS 4,698,153  10/1987  Matsuzaki et al. ............... 210/192
4,725,359  2/1988  Ray ...................................... 210/640

*Primary Examiner*—Frank Sever
*Attorney, Agent, or Firm*—Antonelli, Terry & Wands

[57] ABSTRACT

The present invention relates to a process for producing ultra-pure water, an apparatus for producing said ultra-pure water and a process for using the ultra-pure water produced according to said process. More particularly, the present invention relates to a process for producing ultra-pure water which comprises boiling a raw water to vaporize off the volatile components from the raw water, subsequently generating steam from the water, contacting the steam with a hydrophobic, porous, gas-permeable and liquid-impermeable membrane to make the steam permeate the membrane, and then condensing the steam, as well as to an apparatus for producing said ultra-pure water and a process for using said ultra-pure water.

15 Claims, 14 Drawing Sheets

(a)

(b)

(c)

BREAKDOWN VOLTAGE (V)

PROCESS FOR PRODUCING ULTRA-PURE WATER AND PROCESS FOR USING SAID ULTRA-PURE WATER

BACKGROUND OF THE INVENTION

1. Field of the Invention

The present invention relates to a process for producing ultra-pure water, an apparatus for producing ultra-pure water and a process for using the ultra-pure water produced according to the process. In particular, the invention relates to a technique for producing ultra-pure water from a raw water containing volatile substances such as carbonic acid component, volatile organic substances and the like and nonvolatile substances such as fine particles, microorganisms and the like. Further, the invention also relates to processes for using the ultra-pure water produced according to the process, such as the process for washing and drying a substrate with ultra-pure water in the manufacture of semiconductor wafer, optical disk and the like, the process for oxidizing the silicon surface of semiconductor wafer with ultra-pure water, and the like.

2. Prior Art

In the manufacture of semiconductors and medical drugs, a water of high purity containing as small a quantity of impurities as possible, i.e. ultra-pure water, is required. Particularly, a large quantity of ultra-pure water is used in the washing process of semiconductor integrated circuit (LSI). The purity of ultra-pure water exercises an important influence upon the yield of product. In the currently developed high level LSI's of 1 megabit, 4 megabits, etc., the washing process requires a more enhanced purity of water.

The prior apparatus for producing ultra-pure water is constructed of various filter membranes, ion exchange towers, a germicidal lamp, a deaerating apparatus, etc. as mentioned in Kankyo Gijutsu, Vol. 14, No. 4 (1985), pp. 353-358. FIG. 12 illustrates the outlined view of prior apparatus for producing ultra-pure water. The raw water is subjected to pre-treatments such as aggregation and precipitation, filtration, microfiltration, etc., after which it is sent to a step of reverse osmosis (RO) where the major part of soluble organic components and 90 to 99% of the inorganic salts present in the raw water are removed. The water having permeated the RO membrane is then decarbonated in the deaerating tower, after which it is sent to the ion exchange resin step. The ion exchange resin tower is of two bed/mixed bed regeneration type. In this step, salts are completely removed, and usually a primary pure water having a specific resistance of 10 M$\Omega$·cm or above is obtained in this step and stored in a pure water tank. The pure water is further treated with mixed bed type polishing ion exchange resin to remove impurities more completely. Then, it is made free from microorganisms in the ultra-violet germicidal step and then made free from the residual fine particles and dead microorganisms in the ultrafiltration (UF) step to give an ultra-pure water.

Apart from above, a pure-water producing apparatus using a hydrophobic porous membrane has also been proposed as mentioned in Japanese Patent Application Kokai (Laid-Open) No. 230,703/86. In this apparatus, the inner space is partitioned by a hydrophobic porous membrane which is permeable to vapor of liquids and impermeable to liquids themselves, and one side is used as the path of raw water, while the other side is provided with a cooling plate. The space between the cooling plate and the hydrophobic porous membrane is used as a condensing chamber, and outside of the cooling plate is used as the path of cooling water. The apparatus at least has a separating membrane unit for condensing the vapor supplied from the raw water path and having passed the porous membrane in the condensing chamber and a heat tank having a heater. First, a raw water (e.g. service water or the like) is led to the cooling water path of the separating membrane unit, and the raw water having passed the cooling water path is further led to the heat tank, and the raw water having been heated in the heat tank to a high temperature is led to the raw water path of the separating membrane unit, by pipings.

The above-mentioned prior art involve many elementary instruments such as filter membranes, ion exchange resin, germicidal lamp and the like, and improvement in the water quality of the resulting ultra-pure water necessarily requires to improve the quality of the elementary instruments. In the existing membrane module systems, there are a number of requirements as follows. Thus, the surface of the membrane having a separating performance must be free from defect, and the water having permeated the membrane must be perfectly sealed from raw water. Further, the module must be so constructed that it involves no part allowing the residence of liquid and all the parts of module must be thoroughly washable to prevent the growth of bacteria. Further, the quantity of substances dissolving out of the module must be as small as possible. Thus, a special grade of membrane module is used for production of ultra-pure water. However, a periodic washing by flushing and chemical sterilization are necessary to the prevention of bacterial growth in module. Further, in the desalting process using ion exchange resin, contamination by external impurities must be prevented by some means at the time of regeneration. Further, as the polishing ion exchange resin of the final stage, non-regeneration type of high purity resin which has been thoroughly washed previously must be used.

As above, the prior techniques for producing ultra-pure water have been disadvantageous in that they require considerably many maintenance works for keeping the water quality and the many elementary instruments used therein cause dissolution of contaminative substances to lower water quality, and further the existence of residence part causes a deterioration of water quality.

Further in the prior apparatuses for producing pure water using a hydrophobic membrane, there have been provided no particular decarbonating apparatus nor de-"TOC" (Total Organic Carbon) apparatus for removing carbon dioxide and organic substances from raw water in the fore stage, so that they have been unable to give a high water quality enough for use in the washing of LSI.

SUMMARY OF THE INVENTION

It is an object of the present invention to provide a process for producing ultra-pure water for the next generation which can produce a water of higher purity with a simple apparatus having a smaller number of elementary instruments and, at the same time, can produce a high temperature ultra-pure water which is considered having a higher washing power, and thereby to overcome the above-mentioned disadvantages of prior techniques.

It is another object of the present invention to provide a process for using said ultra-pure water.

(1) The present invention consists in providing a process for producing ultra-pure water which comprises boiling a raw water containing volatile components and nonvolatile components to vaporize off the volatile components, subsequently generating steam from the raw water from which volatile components have been removed, making the steam permeate a hydrophobic porous membrane and then condensing the steam.

As said hydrophobic porous membrane, those permeable to gases and impermeable to liquids are used. More particularly, a raw water is first boiled by means of heating, reduction of pressure, etc. and thereby the volatile impurities present in the raw water such as carbon dioxide gas components ($H_2CO_3$, $HCO_3^-$, $CO_3^{2-}$) and organic substances are vaporized off, after which the raw water free from volatile impurities is again heated and vaporized. The generated steam is passed through the hydrophobic porous membrane, and at this time it is separated from the accompanying mists, and then only the high purity steam is condensed and taken out as the formed water.

By keeping the atmosphere for condensation of the steam as an atmosphere of saturated steam or inert gas and thereby preventing the atmosphere from external pollution, an ultra-pure water having a more enhanced purity can be obtained.

According to the present invention, an ultrapure water containing no microorganisms at all can be produced. Thus, the process of the invention can be said to be a process for producing ultra-pure water having so high a purity as unknown hitherto. Hereunder, accordingly, the ultra-pure water obtained by the present invention will be called "superultra-pure water".

The apparatus for producing the superultra-pure water of the invention comprises a volatile component-removing tower equipped with a means for heating a raw water containing volatile components and nonvolatile components and a means for discharging the vaporized volatile components formed by the heating and a membrane distillation tower equipped with a heating means for vaporizing the water having been made free from volatile components, a hydrophobic porous membrane through which the steam generated by the heating permeates and a cooling means for condensing the steam having permeated the membrane. More preferably, the apparatus is provided with a means for supplying steam or inert gas into the atmosphere for condensation of the steam having permeated the membrane in order to keep said atmosphere as an atmosphere of saturated steam or inert gas.

According to the present invention, a superultra-pure water heated to a temperature higher than ordinary temperature is obtained. Accordingly, the superultra-pure water of the invention is advantageously usable for washing LSI.

As temperature ascends, water decreases its surface tension and increases affinity to substrate and undergoes a smaller influence by static electricity, in its nature. Usually, these advantageous properties of ultra-pure water are utilized by heating an ultra-pure water obtained at ordinary temperature. According to the present invention, however, the above-mentioned advantages can be exhibited without any particular heating. Further, the water obtained according to the invention is quite low in the content of impurities, so that it can relax the problems in the washing of LSI, such as difficulty in formation of desired LSI pattern, increase in leakage current of pn junction, deterioration in pressure resistance of gate oxide film, etc. and thereby it enables to improve the yield and characteristics of LSI.

Further, according to the present invention, there is obtained a high temperature superultra-pure water containing no microorganisms at all or hardly containing microorganisms. Even if it contains microorganisms, their growth can be suppressed to a marked extent by maintaining the water at a high temperature. Thus, the superultra-pure water of the invention is quite effectively usable for washing medical tools and producing medical drugs.

Usually, service water and reverse osmosis-treated water contain various inorganic substances, ions, organic substances and microorganisms in a large amount. According to the conventional process, an ultra-pure water is produced by successively removing these impurities. According to the invention, only the volatile substances which cannot be removed by distillation (carbon dioxide components, volatile organic and inorganic components, ammonia, $SO_3$, etc.) are removed in a first stage by means of heating, reduction of pressure, ozone oxidation, etc. The raw water from which the volatile components have been removed is further heated to generate steam. Since volatile components have already been removed, this steam has a considerably high purity. The steam is further passed through hydrophobic porous membrane, whereby the accompanying water droplets (mists) are removed, and there is obtained a high purity steam containing no impurities other than water. Thereafter, it is condensed to give a superultra-pure water.

In the usual distillation apparatuses, the substances volatile at the same temperature as water such as carbon dioxide gas components and low-boiling organic substances cause problems. In the process of the invention however, these components are removed in the stage (volatile components-removing step), and the minute water droplets (mists) accompanying the steam, formed at the time of distillation, are removed by the gas (steam)-liquid (mist) separation by the hydrophobic porous membrane, so that a superultra-pure water having a high purity and containing no impurities such as ions, organic substances, fine particles and alive microorganisms can be obtained.

Further, by condensing the steam having passed the hydrophobic porous membrane in an atmosphere of saturated steam or inert gas, pollution from the air can be prevented and a superultra-pure water having a more enhanced purity can be obtained.

The present inventors confirmed that a water formed by membrane distillation process contains no nonvolatile components at all or hardly contains such components. Based on this fact, the inventors studied a method for removing volatile components, impossible to remove by membrane distillation, in another process. As the result, the present invention was accomplished.

The present invention consists in providing a step for removing the volatile components present in raw water in advance of the step of membrane distillation, by which purity of the formed water can be enhanced than in a case of providing the volatile component-removing step after the membrane distillation step. More concretely, the pure water after membrane distillation readily dissolves other substances into itself, in its nature, so that if this pure water is heated to vaporize off the volatile components the components contained can be dissolved into the water to lower its purity. Further, removal of volatile components after the membrane distillation step is accompanied by a partial loss of the formed water, which is ineconomical.

This problem can be solved by providing the volatile component-removing step in advance of the membrane distillation step.

When steam is generated by heating raw water in membrane distillation step, the steam is accompanied by mists. However, such mists can be separated by passing the steam through hydrophobic porous membrane.

As said hydrophobic porous membrane, membranes of polyolefins (e.g. polyethylene, polypropylene and the like), polysulfone, polyether sulfone, silicone resin, fluororesin and the like can be used, for example, as mentioned in Japanese Patent Application Kokai (Laid-Open) No. 118,284/85. Preferably, the hydrophobic porous membrane should satisfy the conditions mentioned in Japanese Patent Application Kokai (Laid-Open) No. 118,84/85.

The production of pure water by membrane distillation is a known technique, as disclosed in Japanese Patent Application Kokai (Laid-Open) No. 230,703/86, for example. However, membrane distillation is yet insufficient in the volatile component-removing effect and incapable of producing a superultra-pure water, in itself alone. Concretely saying, when raw water is vaporized, volatile components are also vaporized. When the steam is condensed, the volatile components are partially taken into the condensate, so that the water thus formed contains volatile components and has a low purity.

As the volatile component-removing means used in the invention, it is most effective to boil a raw water and vaporize off the volatile components. As the means for boiling raw water, heating a raw water in the atmospheric air to its boiling temperature or above and boiling a raw water under a reduced pressure are both possible.

When a raw water is heated to vaporize the volatile components, the volatile component-removing effect cannot be high if the water is heated to a temperature lower than its boiling temperature. For example, if the water is heated to a temperature of about 80° C., the superultra-pure water of the present invention is not obtained.

In the membrane distillation, it is preferable to contact only the steam generated from raw water with the hydrophobic porous membrane. One of the important disadvantages of membrane distillation technique is the pollution of membrane. Thus, if raw water is directly contacted with a hydrophobic porous membrane, the membrane is polluted by the nonvolatile components of the water, so that purity of the formed water is deteriorated. When a raw water is contacted with membrane, steam is generated by the sensible heat of raw water and passes through the membrane. In order to generate a large quality of steam by this method, it is required to enlarge the area of membrane and thereby to enlarge its contact area with raw water.

If steam is generated from a raw water from which volatile components have previously been removed and only this steam is contacted with hydrophobic porous membrane, the pollution of membrane can be prevented and the purity of formed water can be enhanced. Further, according to this method, the size of membrane can be smaller than that in the method of directly contacting raw water with membrane.

(2) Further, the present invention also consists in providing a process for producing ultra-pure water which comprises generating steam from raw water outside a clean room for isolating the use point of ultra-pure water from the exterior atmosphere, followed by transporting the steam into the clean room in the gaseous state and condensing it in a condenser equipped with a hydrophobic porous membrane and placed in the neighborhood of the use point.

Thus, a steam generator such as boiler is placed outside the clean room, and the generated steam is transported in the gaseous state to a condenser placed in the clean room and returned to water by a condenser placed in the neighborhood of the use point. The condenser is provided with a hydrophobic porous membrane in its inner space, and the steam just before returning to water is filtered with the membrane to separate the mists (liquid droplets) accompanying the steam. By this, only the steam having a high purity is condensed, and there is formed a ultra-pure water.

Usually, service water and reverse osmosis-treated water contain various inorganic substances, ions, organic substances and microorganisms in a large amount. When such a raw water is subjected to a treatment accompanied by a phase change such as membrane distillation, nonvolatile substances such as inorganic substances, microorganisms and high-boiling organic substances are relatively easily removable, while volatile substances such as carbon dioxide gas components, low-boiling organic substances and the like can hardly be removed. Thus, it is necessary to provide a decarbonating part and a de"TOC" part in advance of membrane distillation tower in order to remove the volatile substances unremovable in the form stage of membrane distillation. Thus, the steam generator provided outside the clean room is divided into two parts. The first part has a decarbonating zone and a de-"TOC" part where the volatile substances are removed by heating, oxidation and the like. Subsequently, steam is generated in the second part or the steam-generating part. Since volatile components are removed in the first part, the impurity contaminating the steam is the accompanying mist (liquid droplet) only. This steam is sent to the condenser placed in the clean room. The condenser is provided with a hydrophobic porous membrane and a cooling surface. The sent steam is filtered with the membrane to remove the accompanying mists, after which only the pure steam is condensed to give an ultra-pure water.

As processes for using the ultra-pure water produced in the above-mentioned manner, the present invention provides the following inventions.

(3) Thus, the present invention provides a process for oxidizing a semiconductor water in water which comprises contacting a semiconductor wafer with a water produced by condensing a steam having permeated a hydrophobic porous membrane and thereby oxidizing the silicon surface of the semiconductor water.

Generally saying, Si surface is much richer than $SiO_2$ surface in activity, so that it takes various polluting components into itself from media contacted with it. If an Si substrate having taken-in the polluting components is oxidized to form $SiO_2$ film on its surface, the $SiO_2$ film is bad in film quality, so that insulating resistance of the wafer is deteriorated. The taking-in of the pollution occurs when the wafer is exposed to the air in clean room in the course of transporting the wafer from the drying step (the final step of washing process) to the oxidation process. As a measure for preventing it, there has been devised a method which comprises forming a thin $SiO_2$ film (some dozen angstroms in thickness) in the washing process and thereafter transporting the wafer to the oxidation process. The formation of thin oxide film is carried out by dipping an Si wafer in an ultra-pure water having a prescribed temperature to make progress an oxidation. However, the wafer obtained by this method is inferior to that produced by the existing process in insulating resistance with a high reproducibility.

The present inventors conducted many studies on the relation between the oxidation in water and the water quality to make the following new findings:

(i) The above-mentioned result is attributable to the bad quality of the very thin oxide film formed by oxidation in water.

(ii) (i) is due to water quality of ultra-pure water.

(iii) If the wafer is oxidized in a water (superultra-pure water) prepared by condensing the steam having permeated a hydrophobic porous membrane, a very thin oxide film of high quality can be formed. Based on these findings, the present invention was accomplished.

Thus, the object of the present invention consists in providing a process for the oxidation in water by which a thin oxide film of good quality can be formed.

The above-mentioned object can be achieved by contacting a semiconductor wafer with a water (superultra-pure water) produced by condensing the steam having permeated a hydrophobic porous membrane.

Today, the water quality of ultra-pure water is evaluated mainly with reference to the following four factors: number of fine particles, number of alive microorganisms, concentration of organic substances and specific resistance. Actually, the water quality of ultra-pure water has become very close to the limits of these measurements.

Thus, the present inventors evaluated the water quality by dropping a predetermined quality of test water onto Si wafer, drying up the water and observing the residue on the wafer (called "water mark").

When 0.097 g of superultra-pure water and 0.101 g of ultra-pure water are dropped and dried at ordinary temperature (19.5° C.), there is no significant difference between their water mark quantities. However, when 0.102 g of superultra-pure water and 0.089 g of ultra-pure water are dried up at high temperature (103° C.), an outstanding difference is observed between their water mark quantities. Thus, the impurities in the superultra-pure water are completely lost by vaporization together with water when dried at a high temperature of 103° C., while the impurities in the ultra-pure water almost completely remain as understandable by comparing the water mark at ordinary temperature with that at high temperature. XMA analysis has revealed that these water marks were mainly composed of organic substance. However, the organic substance in superultra-pure after is evidently different from that in ultra-pure water. FIG. 17 illustrates the infrared absorption spectrum of the water mark of superultra-pure water dried at ordinary temperature, where all the peaks demonstrate that the water mark is a hydrocarbon type substance except for the OH peak due to the water absorbed into KBr at the time of sample preparation and the SiO peak derived from the Si substrate (a part of substrate surface is scraped off when water mark is taken from Si substrate). Making a contrast to the impurities in ultra-pure water which are a mixture of various types of substances, the impurities in superultra-pure water belong to almost one series of substances having neither hydrophilic group nor hydrophobic group. From the viewpoint of adsorption, this exercises a good influence on the film quality at the time of forming $SiO_2$ film.

Since water mark has the above-mentioned properties, water mark is difficult to observe by SEM etc. where the sample is exposed to vacuum or high temperature.

Another important difference between superultra-pure water and ultra-pure water is that ultra-pure water contains no detectable silica (JIS K 0101). In water, silica dissociates to a very slight extent and combines with the Si of surface having dangling bond, due to which the quality of formed oxide film is deteriorated.

(4) Further, the present invention also consists in providing a process for producing a semiconductor which comprises the first step for washing a semiconductor wafer with a chemical solution, the second step for subsequently washing the semiconductor wafer with ultra-pure water, the third step for subsequently forming an oxide film on the surface of the semiconductor wafer in a condensed water obtained by condensing a steam having permeated a hydrophobic porous membrane, the fourth step for drying the semiconductor wafer and the fifth step for subsequently oxidizing the semiconductor wafer.

In the recent years, the degree of integration of semiconductors is markedly increasing and D-RAM of megabit class are mass produced largely. Further, the production is advancing into 4M bits and 16M bits of products. In the phase of design rule, 0.8 $\mu$m, smaller than 1.0 $\mu$m, is adopted in megabit class, so that even a very slight quantity of impurities has become unallowable. At the same time, the oxide film is becoming thinner from 200 Å to 100 Å.

In general, semiconductor wafer is washed first with a solvent (triclene, acetone $H_2O_2$-$NH_4OH$ mixture) to remove the fatty substance adhering to the substrate surface, and then with acid-alkali (HF, $H_2O_2$-$NH_4OH$, HCl-$H_2O_2$ mixture) to wash away the metallic polluting substances successively and finally with ultra-pure water, after which the drops of the ultra-pure water are removed and the wafer is sent to the next step. The washing using ultra-pure water is usually achieved by dipping the semiconductor wafer in a large quantity of water for 20 to 40 minutes by the method of overflow, in order to remove the chemical substances. After washing it, the water drops on the wafer are removed by rotating the wafer at a high speed and throwing off the water drops (the spin drying method) or by substituting the water drops with isopropyl alcohol (IPA) vapor and then drying the wafer (the IPA vapor drying method). Although the ultra-pure water used herein for removing the chemical substances is as high as specific resistance 18M$\Omega$·cm or above, TOC 50 ppb or below, and fine particles greater than 0.1 $\mu$m 50 particles/ml or less, defects yet appear quite readily if the removal of water drops is insufficient after the washing. Further, as the design rule comes to the order of submicron, a smaller thickness and a higher performance is required of the oxide film ($SiO_2$) used there.

The methods of oxidation today adopted are classified into dry method and wet method. In both the methods, oxidation is carried out in a furnace kept at 800° to 1,000° C., even though the atmosphere of oxidation is oxygen in one of them and oxygen-steam in the other.

The time of oxidation is about 0.5 to 1 hour for forming an oxide film of about 200 Å.

In the conscientious washing a semiconductor water, it is necessary that no impurities (for example, fine particles and dissolved substance present in solution and water) remain on the surface of washed product ultimately according to the above-mentioned washing and drying technique, and it is desired that the washing can be practiced rapidly and inexpensively. However, the above-mentioned prior art yet has an unsatisfactory point, and therefore it can leave the impurities. Thus, since the prior washing with water consumes a large quantity of ultra-pure water to replace the chemical solutions, the washing takes a long period of time and, at the same time, the semiconductor wafer having a hydrophobic surface tends to be polluted at the time of transporting it into the oxidation step or in the period for transporting it from washing tank to oxidation furnace. Further, in the drying step, the spin drying method is imperfect in that the thrown water drops are reflected on the outer wall and adhere to the product. Although IPA vapor drying method is less sensible to the influence of impurities in ultra-pure water because the water is actually replaced with IPA, it has the problem of the impurities in IPA because IPA mist can adhere to the product.

It is the object of the present invention to provide a process for producing a semiconductor which comprises forming an oxide film on the surface of semiconductor wafer in a superultra-pure water prepared by condensing a steam having permeated a hydrophobic porous membrane and thereby preventing the pollution in the course of transportation and further forming an oxide film of good quality while controlling the velocity of oxidation in the superultra-pure water.

The above-mentioned object can be achieved by comprising the first step for washing a semiconductor wafer with a chemical solution, the second step for subsequently washing the semiconductor wafer with ultra-pure water, the third step for subsequently forming an oxide film on the surface of semiconductor wafer in a pure water prepared by condensing a steam having permeated a hydrophobic porous membrane, the fourth step for drying the semiconductor wafer, and the fifth step for subsequently oxidizing the semiconductor wafer.

In the first step, the fatty substances adhering to the surface of semiconductor wafer are washed away with a solvent and metallic impurities are washed away with acid and alkali, successively. In the second step, the chemical solution adhering to the surface of semiconductor wafer is washed away with ultra-pure water. In the third step, a hydrophilic thin film of oxide is formed on the surface of semiconductor wafer with the dissolved oxygen in water in a pure water containing no metallic ions exercising adverse influence on the semiconductor which has been prepared by making a steam permeate a hydrophobic porous membrane to remove the mists containing metallic components and then condensing it. In the fourth step, the water adhering to the thin oxide film formed on the surface of semiconductor wafer is dehydrated and dried. In the fifth step, an oxide film is additionally formed on the thin oxide film on the semiconductor wafer in an oxidation furnace.

(5) Further, the present invention also consists in providing a process for washing and drying a substrate which comprises washing away the polluting substances adherent to a substrate with solvents and ultra-pure water successively and finally the substrate is washed with ultra-pure water and then the substrate is heated to vaporize off the water adherent to its surface by heat transfer.

The present invention relates to a process for washing and drying a substrate in the production of semiconductor wafer, optical disk and the like. In particularly, the invention relates to a process for washing a substrate with ultra-pure water and then drying it suitable for preventing the occurrence of residual deposits on the substrate.

In the production processes of semiconductors and various optical and electronic parts, the thin film-forming technique is largely adopted. For example, in the production of semiconductor wafer, $SiO_2$ film is formed on Si substrate by oxidation and a thin film of insulating material or metal such as aluminum is formed by vapor deposition. In the production of optical disks, a film of metal such as nickel is formed on substrate by plating or a film of photosensitive material is formed by coating. In any of these techniques, the substrate surface must be washed and then brought into dryness as a pre-treatment, because the polluting substances adherent to the substrate surface make troubles on the thin film formation in the subsequent step and ultimately affect the performances of product. Accordingly, not only the working environment and production processes but also the intermediate washing and drying steps between the processes must be made clean indispensably. The technique for washing semiconductor wafer is mentioned in, for example, ULSI, 1986.2, pp. 33–38 under the title of "Technique for Washing Wafers". Here, the technique will be explained below mainly on the production of semiconductor wafer.

In general, the washing process of semiconductor wafers is carried out in the following manner. First, the fatty substances adherent to substrate surface are removed with a solvent such as triclene, acetone, $H_2O_2$-$NH_4OH$ mixture or the like, and then metals are successively washed away with acid and alkali solutions such as $H_2O_2$-$NH_4OH$, $HCl$-$H_2O_2$ mixture, HF and the like, and finally these chemical solutions are removed with pure water and the water drops are completely removed by drying, after which the wafer is sent into the subsequent oxidation, diffusion, CVD step. In this step, TOC (total organic carbon content) in pure water (or ultra-pure water) is limited to 10 to 50 ppb or less when the degree of integration is 4 Mbit, and the size of fine particles remaining on the substrate must be 0.08 μm or above (it corresponds to about 1/10 of pattern circuit dimension). Therefore, a very prudent device is required of the final drying step.

In the prior processes, said drying has been carried out by irradiating thermal rays or infrared rays, or by rotating the substrate washed with water and throwing off the water drops mechanically by centrifugal force (the so-called spin drying), or by heating an organic solvent such as isopropyl alcohol, condensing its vapor on the substrate surface to replace and remove the adherent water with the condensed solvent and then vaporizing off the solvent (the so-called vapor drying).

In the washing process of substrate of semiconductor wafer and the like, it is important to prevent the deposition of dissolved substance in the washing liquid on the substrate surface in the step of drying the liquid ultimately remaining on the surface, whether the washing liquid is water or organic solvent, and a rapid method free from re-pollution is desired. The above-mentioned prior technique lacks consideration in this point and involves a great risk of leaving the above-mentioned deposits. That is, in the method using hot air or infrared irradiation, heat is propagated from the outer surface of water drops adherent to substrate surface and promotes the vaporization of water drops, so that in the course of concentration, the water drops deposit out the dissolved substances on the contacted area between water and substrate functioning as a cooling surface. Since this order does not change regardless of thermal transfer between the area and other area of substrate, this method tends to leave deposits ultimately. Although spin drying method is advantageous in that it is relatively free from the pollution by flying fine particles and the consumption of washing liquid can be saved, it is disadvantageous in that the residual adherent water forms solid deposits in the above-mentioned process of drying and the rotation is difficult to control and maintenance is troublesome. Although vapor drying method can prevent the re-deposition of fine particles, substitution of water with organic solvent and drying of the solvent take a long period of time and maintenance work is laborious. Further, there is similarly a risk of leaving deposits originated from the dissolved substances in the solvent.

In view of the above-mentioned disadvantages in the prior art, the object of the present invention consists in providing a process for washing and drying a substrate which comprises washing a substrate with ultrapure water and thereafter rapidly drying up the adherent water remaining on the substrate surface and, at the same time, preventing the substrate surface from development of deposits formed by the drying.

According to the present invention, a substrate is washed with solvents and ultra-pure water successively and the adherent water ultimately left on the substrate surface is dried up by vaporization by heating the adherent water through intermediation of the contact surface between the substrate and the adherent water, and this vaporization is made to take place at the gas-liquid interface on the surface of adherent water. Thus, in the vaporization process of the adherent water, the concentration of water to dryness at the contact surface between water and substrate surface, i.e. solid-liquid interface, is prevented. The ultra-pure water used herein is preferably an ultra-pure water produced by a distillation of vaporized water/or a membrane distillation using a hydrophobic membrane (for example, fluororesin membrane or the like) permeable only to steam. Since these distillations are worked at a relatively low temperature of about 100° C., inorganic substances hardly contaminate the ultrapure water. Although organic substances present in raw water, particularly low-boiling organic substances, accompany the steam and enter the formed water, i.e. ultra-pure water, in the step of condensation, its concentration (TOC) can be controlled so as to become as low as 10 ppb or less. Accordingly, by the drying means of the invention, the organic substances dissolved in the course of vaporizing the adherent water is made to accompany the steam in the same manner as above, whereby the object of the present invention can be achieved.

In heating the substrate, heat is transferred by using a heating element placed in a clean atmosphere as the heat transfer surface to maintain a temperature not causing any violent boiling at the interface between substrate surface and adherent water and not bringing about dryness. That is, overheating can be prevented by controlling the temperature so as not to exceed the saturation temperature of water. If the temperature of heating is too low, the vaporization progresses very slowly and dissolved substances having a boiling point higher than that temperature are deposited. Accordingly, it is an indispensable condition to maintain an appropriate velocity of vaporization. This vaporization velocity is proportional to the temperature of substrate (i.e. heat transfer surface)/or the temperature difference at the boundary layer. Accordingly, the substrate temperature should be adjusted to a temperature close to the uppermost boiling point of dissolved organic substances and boiling point of water to keep an appropriate velocity of vaporization. As understandable from the examples mentioned later, the vaporization velocity is preferably about 4 g/hour or above. It is also possible to heat the substrate without any heat transfer surface. For example, the substrate itself may be heated to the above-mentioned condition by excess current formed by electromagnetic induction of high frequency wave or the like. The vaporized steam/formed gas mixture may be discharged by utilizing the inner pressure of container or by pressure release by throttle mechanism, or by providing an exhaust hole under ordinary pressure.

According to the present invention, the water drops adherent to substrate surface vaporize from the drop surfaces in the process of vaporization and are not concentrated at the interface between drops and substrate surface, and the temperature is maintained at the boiling point of dissolved substance, so that the dissolved substance is accompanied by steam into the gas phase. Further, at the contact part with substrate, the liquid has a high temperature and is not cooled, so that the solubility of the dissolved substance is kept high. Thus it is not deposited but vaporized in the process of vaporization. As the result, the concentration of the dissolved substance (TOC) in water drops is kept constant or tends to decrease, and when the vaporization is completed the surface can be dried up without any residue. Since an ultra-pure water selectively containing the low-boiling organic substances of raw water can be obtained by the distillation or membrane distillation of vaporized water, an ultra-pure water having a lower TOC exhibits the above-mentioned effect more markedly and can prevent the pollution of substrate more effectively.

In the invention, the temperature of the process is dependent on saturated temperature of water, and the latter can be varied by changing the pressure in container. Even if the boiling point of the dissolved substance, particularly organic substance, in the ultra-pure water changes, the temperature of the process may be varied in accordance with the boiling point, whereby the pollution of substrate in the process of drying can be prevented.

Next, examples of the invention will be illustrated with reference to the accompanying drawings, in order of the process for producing ultra-pure water, the apparatus and the processes for using the ultra-pure water. The present invention is by no means limited by these examples.

(1) EXAMPLE 1

Figure 1:
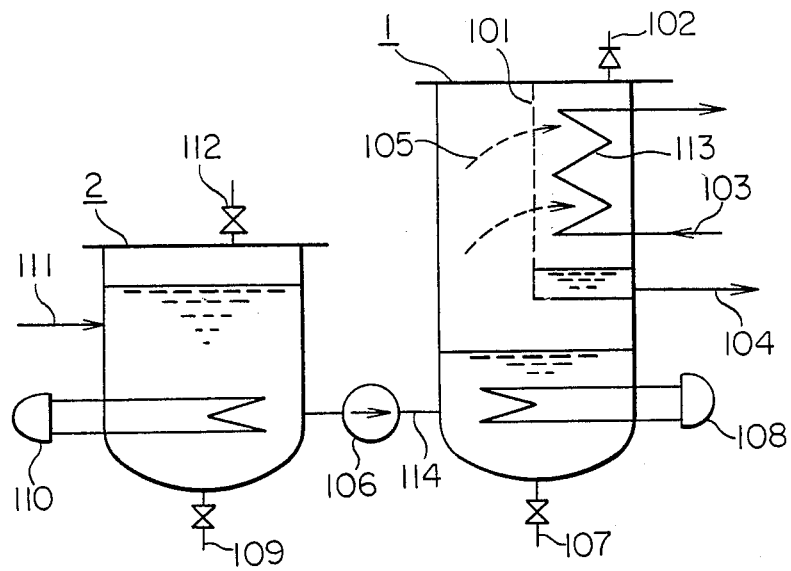
FIG. 1 is an outlined diagram illustrating the construction of one example of the apparatus for producing the superultra-pure water of the invention.

FIG. 1 illustrates a fundamental example of the present invention. This apparatus is constructed of volatile component-removing tower 2 having raw water heater 110 and vapor discharging hole 112, membrane distillation tower 1 having raw water heater 108, hydrophobic porous membrane 101 and condensing surface 113, raw water piping 114 connecting between the volatile component removing tower and the membrane distillation tower, and pump 106 for sending raw water provided in the middle of said piping. Raw water 111 to be treated is introduced int the volatile component removing tower 2 and heated and boiled by raw water heater 110, whereby the carbon dioxide gas and volatile organic substances in the raw water are vaporized and discharged from vapor outlet 112 out of the system together with steam. The raw water from which the dissolved carbon dioxide gas and volatile organic substances have been removed is then sent into membrane distillation tower 1 by water supply pump 106. The raw water having entered membrane distillation tower 1 is again heated by raw water heater 108 and vaporized. The steam 105 generated by the vaporization is filtered with hydrophobic porous membrane 101, condensed on the condensing surface 113 cooled by the flowing cooling water 103, i.e. on the surface of cooling water piping, and taken out as formed water (superultra-pure water) 104. In this example, the cooling means is constructed of cooling water 103 and condensing surface 113. Although the major part of the steam passing hydrophobic porous membrane is made into superultra-pure water, its minor part is blown out from valve 102 in order to remove the uncondensable gases in the system. In order to prevent the scaling in raw water heaters 108 and 110, the raw water is also blown out from respective drain valve 107 and 109, preferably. Since in this apparatus the carbon dioxide gas components and volatile organic substances present in raw water can be removed in the fore stage of membrane distillation tower, a superultra-pure water of high purity can be produced.

Figure 2:
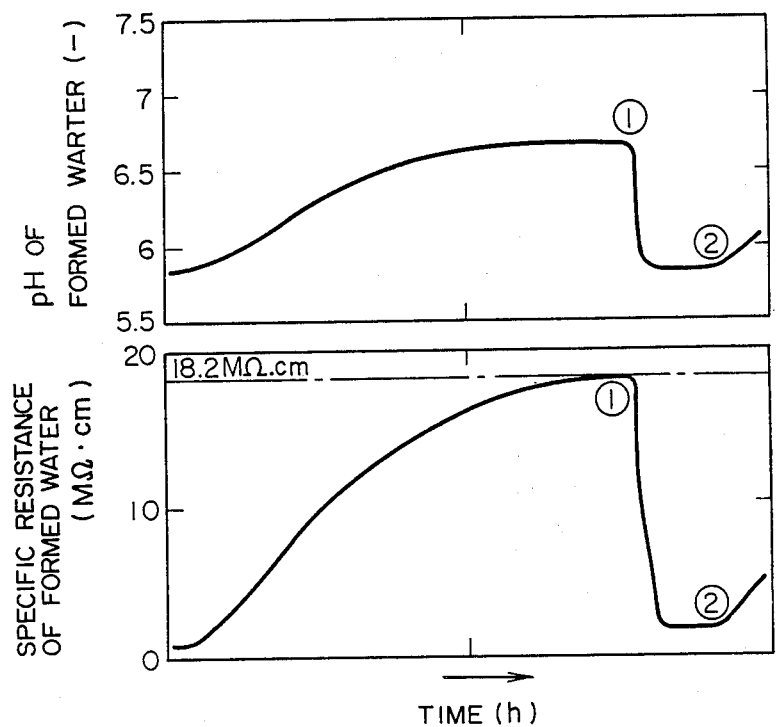
FIG. 2 is a characteristic graph illustrating the water quality of an ultra-pure water obtained by the production process of comparative example.
Figure 3:
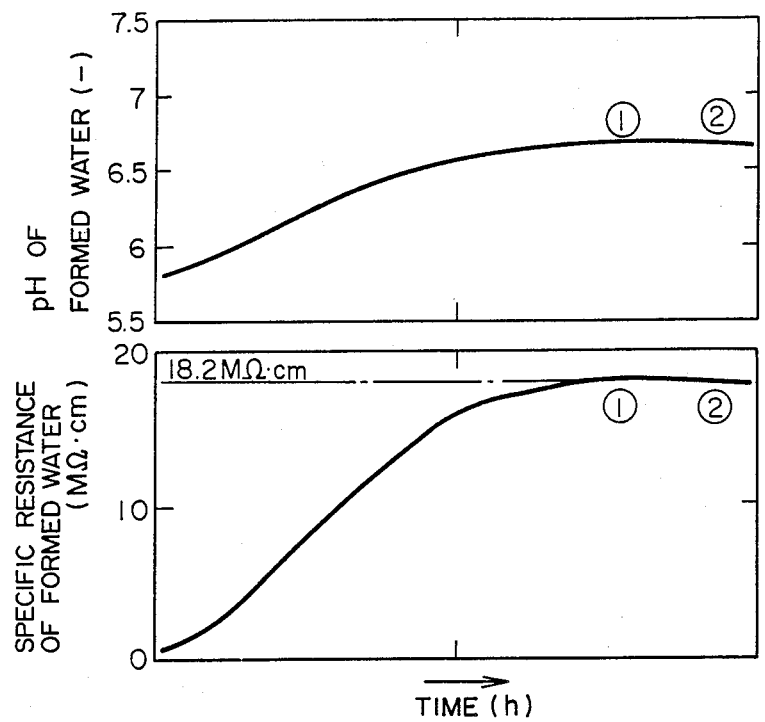
FIG. 3 is a characteristic graph illustrating the water quality of a superultra-pure water obtained according to one example of the invention.

Next, the properties of the superultra-pure water produced with this apparatus will be illustrated with reference to FIGS. 2 and 3. FIG. 2 illustrates specific resistance and pH of formed water produced by feeding a raw water (reverse osmosis-treated water) into membrane distillation tower, for comparison with example of the present invention. FIG. 3 illustrates those in this example. In both FIGS. 2 and 3, (1) means the point at which feeding of water into membrane distillation tower is started, and (2) means the point at which the feeding of raw water is stopped. In FIG. 2 where the raw water does not pass volatile component removing tower, specific resistance of formed water descends to a few MΩ·cm simultaneously with the start of water feed. Since pH also decreases from 6.7 to about 5.8 at this time, it is considered that carbon dioxide gas enters the formed water to form carbonate ion and bicarbonate ion lowering the specific resistance. On the other hand, in FIG. 3 where a water having passed volatile component removing tower is fed, specific resistance and pH of formed water are not changed by starting water feed, demonstrating that a formed water of high purity is continuously obtained.

According to one analysis on the water quality of the superultra-pure water obtained according to this example, no microorganisms were detected at all. The number of fine particles having a particle size of 0.1 μm or above was 10 or less per 1 mm$^3$, and the total organic carbon content (TOC) was 10 ppb.

Figure 12:
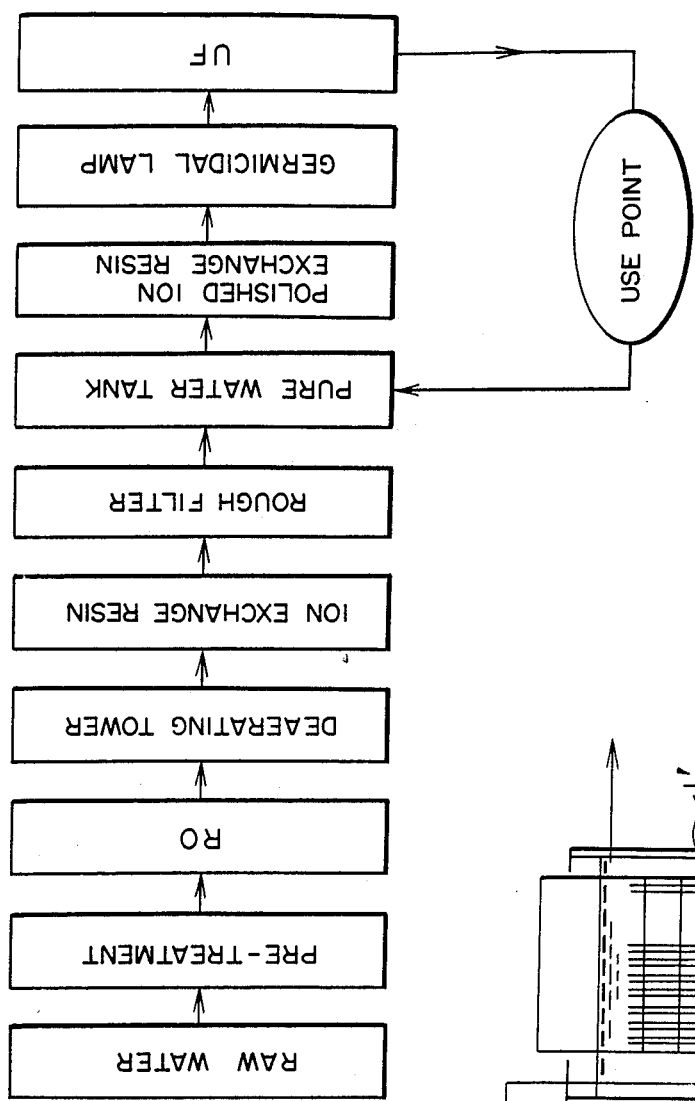
FIG. 12 is an outlined diagram illustrating the prior production process of ultra-pure water.

Using the formed water obtained in this example and a formed water prepared in the prior apparatus for producing ultra-pure water shown in FIG. 12, water marks were prepared on silicon wafer, and they were compared with each other. The term "water mark" means a residue formed by dropping one drop of water on a silicon wafer and drying it up. When water marks formed by drying drops at ordinary temperature (19.5° C.) were compared, the formed water of the apparatus of the invention gave a considerably smaller quantity of residue, demonstrating its high purity. When the drops were dried at 103° C., the merit of the apparatus of the invention was exhibited more evidently. Thus, when the drying was carried out at high temperature, the water mark appearing at ordinary temperature completely disappeared and nothing was observable on the silicon wafer. On the other hand, in case of the formed water prepared by prior apparatus, a considerable quantity of impurity was observed, even though its quantity was a little smaller than that at ordinary temperature. This result indicates that, if the water prepared with the apparatus of the invention contains a quantity of impurity, the impurity is exclusively composed of volatile substances which completely vaporize to leave nothing on the wafer water dried at high temperature. It is apparent from this fact that the formed water of the present invention is quite effectively usable in the production of LSI.

EXAMPLE 2

Figure 4:
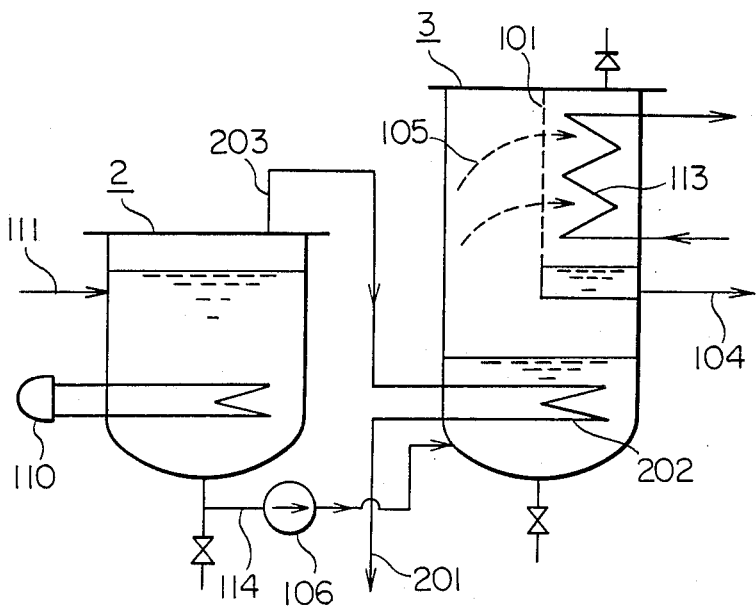
FIGS. 4 to 7 are outlined diagrams illustrating the constructions of other examples of the apparatus for producing superultra-pure water of the invention.

FIG. 4 illustrates another example of the present invention. This apparatus is constructed of volatile component removing tower 2 having raw water heater 110, heat exchanger for heating raw water 202, membrane distillation tower 3 having hydrophobic porous membrane 101 and condensing surface 113, and water feeding pump 106 for transporting raw water between them. The raw water to be treated 111 is introduced into volatile component removing tower 2, where it is heated and boiled by raw water heater 110 to vaporize the carbon dioxide gas and volatile organic substances present in it and discharges them out of the system from vapor outlet 203. The raw water from which the dissolved carbon dioxide gas components and volatile organic substances have been removed is sent to membrane distillation tower 3 by feeding pump 106. The raw water having entered the membrane distillation tower 3 is again heated and vaporized by the heat exchanger for heating raw water 202. The heating medium in the heat exchanger for heating raw water 202 is the steam generated in volatile component removing tower 2. After releasing its latent heat, the resulting liquid water is discharged out of the system from outlet 201 of heat exchanger. The steam 105 generated by the heating action of heat exchanger for heating raw water 202 passes hydrophobic porous membrane 101 where the accompanying mists are removed, after which the steam is condensed on the condensing surface 113 and taken out of the system as formed water 104, i.e. as a superultra-pure water. With this apparatus, a superultra-pure water having a high purity similarly to that of Example 1 is obtained. Further, since the heat consumed in volatile component removing tower 2 is recovered, the consumption of energy can be saved. When the heat exchanger for heating raw water 202 is insufficient in capacity in itself alone as heat source for heating raw water in the membrane distillation tower, raw water heater 108 shown in FIG. 1 may be provided in combination with it.

EXAMPLE 3

Figure 5:
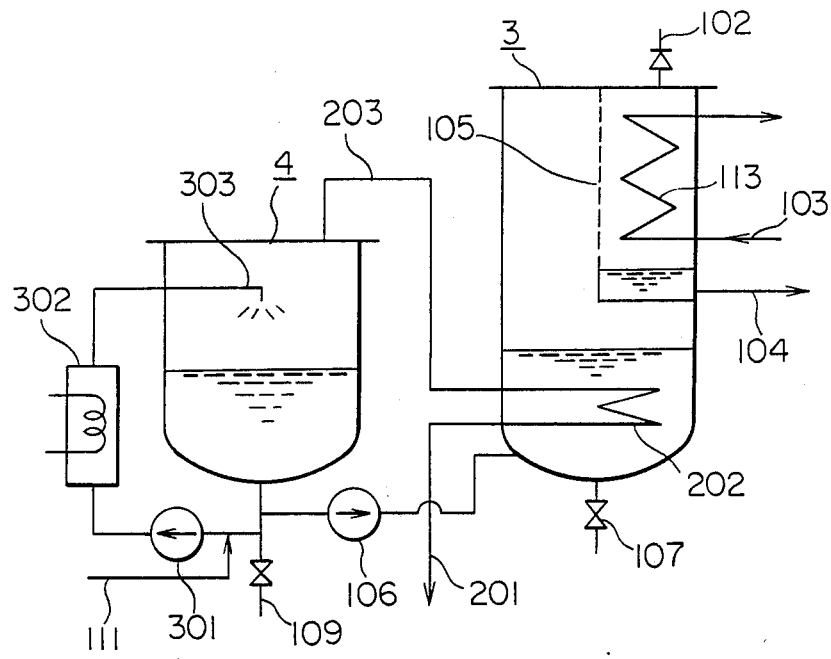

Referring to FIG. 5, an example using flash evaporation as a means for removing volatile components from raw water will be illustrated.

This apparatus is constructed of volatile component removing tower 4 having spray pump 301, raw water heater 302 and spray nozzle 303 and membrane distillation tower 3. The raw water to be treated 111 is introduced into the suction side of spray pump 301 and pressurized by the pump, after which it is heated by raw water heater 302 to a temperature a few degrees (e.g. 5°–10° C.) higher than the saturated temperature in the volatile component removing tower and then discharged into the system from spray nozzle 303. Here, the intermediate part from pump 301 to spray nozzle 303 must be pressurized up to a pressure not lower than the saturated pressure at the temperature to which the raw water heater 302 has elevated, and vaporization (boiling) in piping must be prevented. The raw water sprayed from spray nozzle 303 is rapidly heated to the inner temperature of volatile component removing tower 4 and vaporized to form steam. At this time, the carbon dioxide gas components and low-boiling organic components dissolved in the raw water are also gasified simultaneously and released into gas phase. The liquid staying in the volatile component removing tower 4 without vaporization is again led to spray pump 301, where it is subjected to flash evaporation. The steam generated herein, carbon dioxide gas components and low-boiling organic components are taken out of the system from steam outlet 203, sent into heat exchanger for heating raw water 202 of membrane distillation tower 3 and utilized as a heat source of membrane distillation. The raw water treated in volatile component removing tower 4 is sent into membrane distillation tower 3 by feeding pump 106. Thereafter, it is treated in the same manner as in FIG. 4 to give a formed water of high purity. In the present example, raw water is fed into the suction side of spray pump 301, and it is overheated above its boiling point by raw water heater 302 before being fed into volatile component removing tower 4 and flash-evaporated from spray nozzle 303. Accordingly, the raw water passes the step of flash evaporation at least once before being introduced into feeding pump 106 leading to membrane distillation tower 3, so that feeding of untreated raw water into membrane distillation tower 3 is prevented.

EXAMPLE 4

Figure 6:
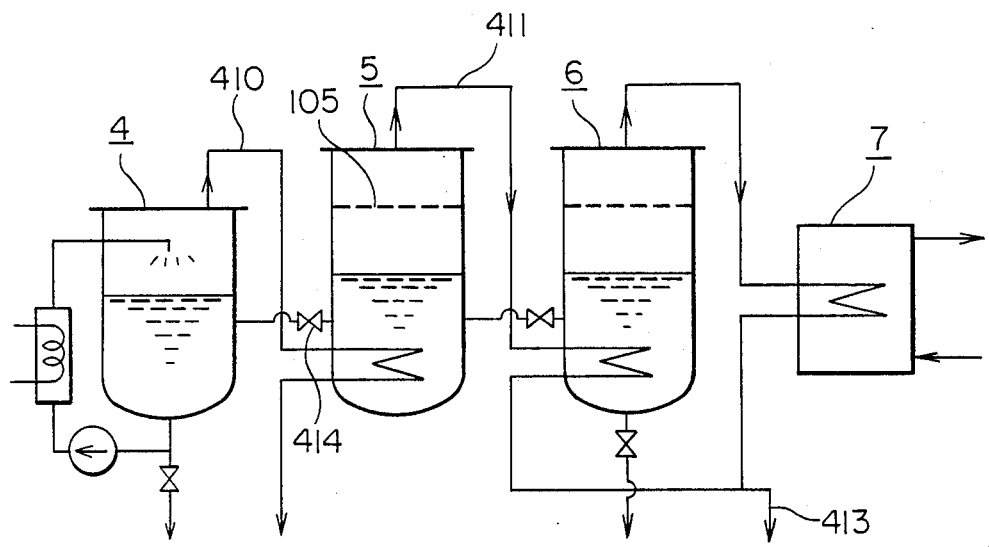
Figure 7:
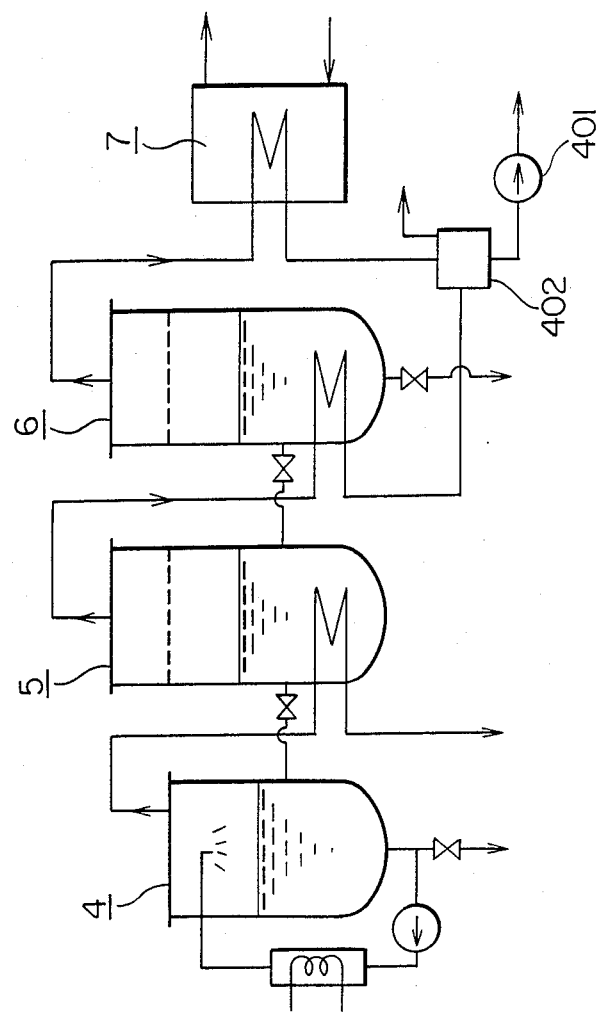

FIG. 6 illustrates one example of multi-state process devised with consideration of the cost of formed water. The raw water which has been made free from carbon dioxide gas components and volatile TOC components by flash evaporation in volatile component removing tower 4 is sent into the first membrane distillation tower 5. Since the first membrane distillation tower 5 is in a saturated state at a lower pressure and a lower temperature than in volatile component removing tower 4, the raw water can be sent into the first membrane distillation tower 5 by merely operating valve 414. Here, the latent heat of steam 410 generated in volatile component removing tower 4 is utilized for heating the raw water in the first membrane distillation tower 5. The steam 411 generated in the first membrane distillation tower is separated from mist when it passes through hydrophobic porous membrane 105, after which it passes piping 411 and is utilized for heating the raw water in the second membrane distillation tower. The steam having released its latent heat for heating the second membrane distillation tower returns to liquid water, which is discharged out of the system from heat exchanger outlet 413. The final step of this multi-stage process is provided with a simple condenser 7 where the generated high purity steam is condensed to give an ultra-pure water. Since the final stage is worked in the neighborhood of atmospheric pressure, the withdrawal of the formed water is prevented from contamination by dust formation in sliding parts such as pumps and the like. If a high-performance dust-free pump 401 shown in FIG. 7 is, developed, however, it will become possible to send the formed water into outside of the system by providing a small-sized formed water tank 402. In this case, the final stage can be worked under a considerably reduced pressure and air can be drawn from formed water tank 402.

EXAMPLE of PRIOR ART

FIG. 12 illustrates an outlined view of prior apparatus for producing ultra-pure water. The raw water is subjected to pre-treatments such as coagulation-precipitation, filtration, microfiltration, etc. and then sent to the step of reverse osmosis (RO) where the major part of dissolved organic components and about 90% of inorganic salts present in the raw water are removed. Then, the reverse osmosis water is decarbonated in deaerating tower and sent to ion exchange resin step.

Although vacuum deaerating tower is usually used as the deaerating apparatus, a deaerating module using hydrophobic porous membrane is also devised for this purpose (for example, see: Japanese Patent Application Kokai (Laid-Open) No. 118,284/85).

The ion exchange tower is of two bed/mixed bed regeneration type. In this step, salts are completely removed, and usually a primary pure-water having a specific resistance of 10 M$\Omega$·cm or above is obtained. The primary pure water is once stored in a pure water tank. Then, it is treated in a mixed bed type polishing ion exchange resin tower to remove the impurities further completely, after which alive microorganisms are eliminated in a ultraviolet germicidal step and then the residual fine particles and dead microorganisms are removed by ultrafiltration (UF) to give an ultra-pure water.

According to this prior process, an ultra-pure water having an ordinary temperature (about 25° C.) is obtained.

In the best case, water quality of the ultra-pure water produced by the use of this prior apparatus is as follows: number of microorganism 0.05/ml; number of fine particles having a size of 0.1 $\mu$m or above 50 to 100 particles/ml; TOC 100 ppb; electrical specific resistance 18 m$\Omega$·cm.

EFFECT OF THE INVENTION

The present invention consists in boiling a raw water containing volatile components and nonvolatile components, such as service water and the like, to vaporize off the volatile components, followed by generating steam from the raw water, contacting the steam with a hydrophobic porous membrane, making the steam permeate the membrane, and then condensing the steam to obtain a superultra-pure water.

According to the invention, there can be produced a superultra-pure water having a lower content of impurities than the waters produced by prior processes for producing ultra-pure water by the combined use of various filter membranes, ion exchange resins, germicidal lamp, etc.

(2) EXAMPLE 5

Figure 8:
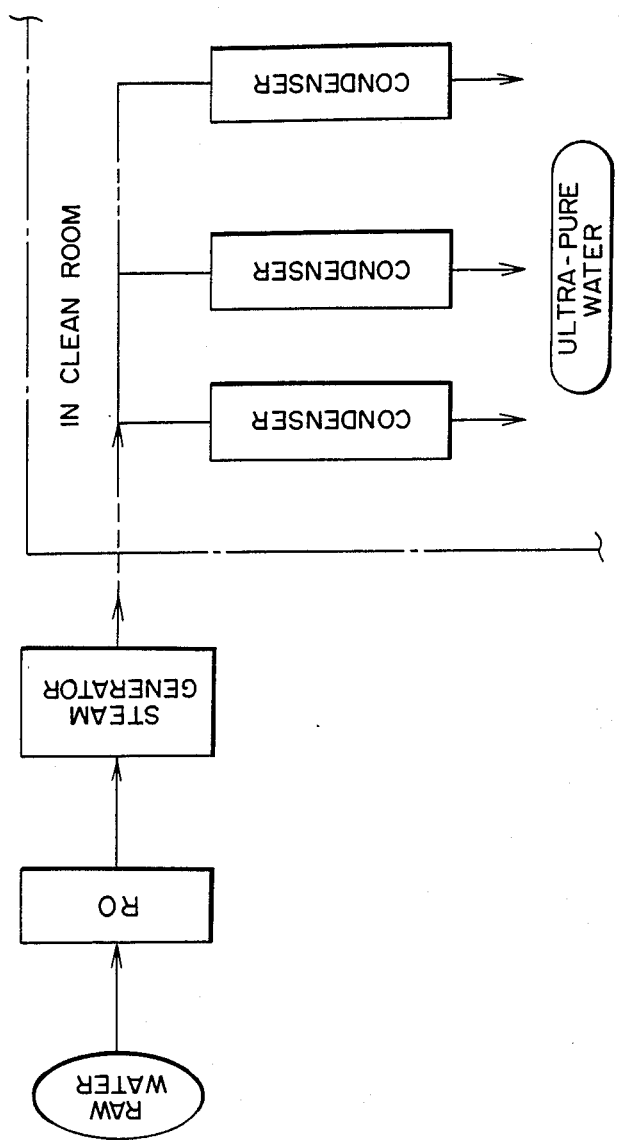
FIG. 8 is an outlined flow diagram of the present invention.

FIG. 8 is the fundamental flow diagram of the present invention. A raw water such as service water is pre-treated by means of RO or the like in order to prevent the scaling in steam generator. The pre-treated water is sent into a steam generater where the volatile substances are removed. Then, the steam free from volatile substances is sent in the state of steam into a clean room via a clean piping and enters a condenser placed in the neighborhood of use point. After removing the mists in the steam by means of hydrophobic porous membrane placed in the condenser, the steam is condensed and formed into an ultra-pure water.

Figure 9:
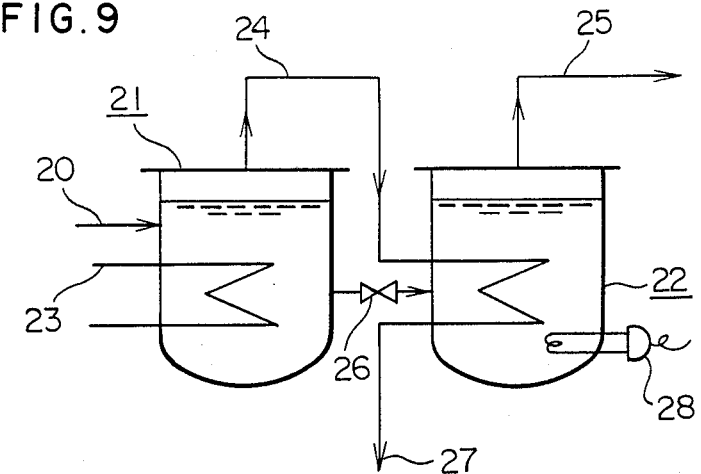
FIG. 9 is an outlined diagram illustrating the construction of steam generater.

FIG. 9 illustrates one example of the outlined view of the steam generater. The pre-treated raw water 20 enters de-$CO_2$ de-TOC part 21 where it is boiled with heater 23 to remove $CO_2$ and TOC components together with steam. Though a direct heating is adopted in this example, other methods such as flash evaporation and the like are also usable. This steam 24 serves as the heat source for steam generation in the subsequent steam generating part 22, and the condensed water thereof is discharged out of the system as drain 27. The raw water having been made free from $CO_2$ and TOC components in the de-$CO_2$ de-TOC part 21 then passes flow control valve 26 and enters steam generating part 22 where the raw water is converted to steam. The steam is sent via piping 25 into clean room. For controlling heat quantity, an auxiliary heater 28 is provided.

Figure 10:
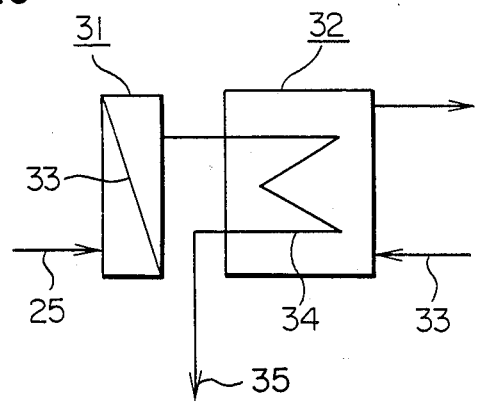
FIG. 10 is an outlined diagram illustrating the construction of condenser.

FIG. 10 illustrates the outlined view of condenser. The steam sent from piping 25 passes membrane module 31 having a hydrophobic porous membrane 33 where it is separated from the accompanying mist. The elementary material of said hydrophobic porous membrane 33 is polytetrafluorethylene, polypropylene polyethylene, or the like. The steam separated from mist is led into condenser 32 where it is condensed on the cooling surface 34 cooled with cooling water 33 and then taken out an ultra-pure water 35. According to the present example, an ultra-pure water of high purity containing a very small quantity of impurities other than water can be taken out in a high temperature state. Characteristics of the water having passed the membrane module 31 are as follows: specific resistance 18 M$\Omega$·cm or above; number of fine particles having a size of 0.1 $\mu$m or above: 100 particles/liter or below; number of microorganisms 10/liter or below; organic substances 10 ppb or below.

Figure 11:
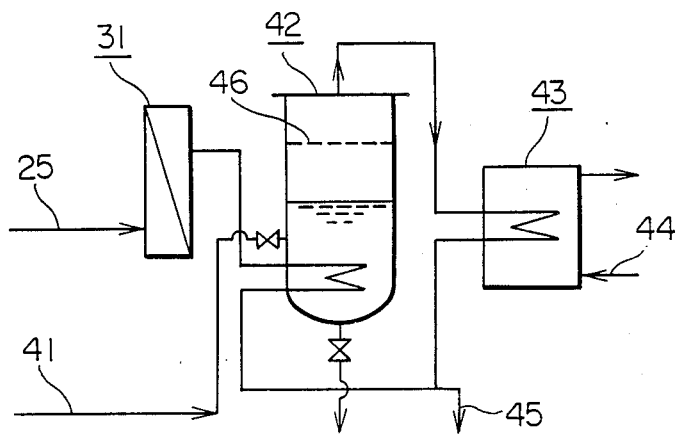
FIG. 11 is an outlined diagram illustrating the construction of heat recovery type condenser.

FIG. 11 illustrates the outlined view of heat recovery type condenser. Since the above-mentioned structure of condenser is insufficient in the point of heat recovery, the condenser of FIG. 11 is made into multistage structure for the sake of heat recovery. The steam sent from piping 25 is filtered by membrane module 31 end then sent into the first tower 42 where it is cooled with raw water 41 to give an ultra-pure water. The raw water 41 is sent from the steam generator placed outside the clean room. At the same time, the raw water in the first tower 42 vaporizes, and the steam is filtered by hydrophobic porous membrane 46 and then condensed in the second tower 43 with cooling water 44 to give pure water 45. According to this process, the cost of formed water can be reduced because heat can be recovered. Though this example refers to the case of two stage condensation, 3-stage and 4-stage condensation are also adoptable.

In FIG. 8, the steam is returned to water by means of a condenser and the water is used as superultra-pure water. However, when the use of steam is more effective than the use of water for the washing of LSI, the cooling surface 34 (FIG. 10) may be subtracted from the present process. By this, a clean steam can be obtained.

According to the present invention, the volatile components making troubles in usual distillation apparatuses is removed in steam generater and the accompanying mist is removed by the hydrophobic porous membrane in the condenser, so that an ultra-pure water not containing these impurities can be produced. Further, the contamination of ultra-pure water by dissolving-out substances and the like in the course of transportation, which has hitherto been considered a difficult problem, can be prevented because steam is filtered and condensed just before use point, so that a water quality higher than ever can be obtained. Further, since the formed water has a high temperature, it is directly usable as a high temperature ultra-pure water more effectively usable for washing wafers and the like.

(3) EXAMPLE 6

Figure 13:
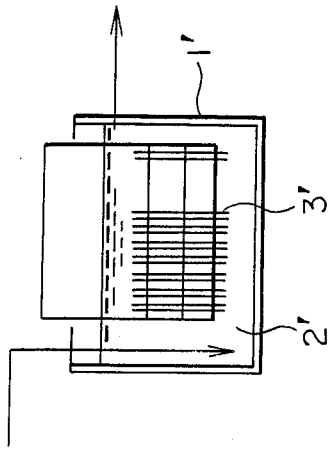
FIG. 13 is a front view of one example of the invention.

FIG. 13 illustrates one example of the in water oxidation process according to the present invention. A desired quantity of a superultra-pure water 2' having a desired temperature is introduced into a quartz glass container 1'. Si wafer 3' is oxidized by dipping it in the superultra-pure water 2' for a predetermined period of time. Thickness of the oxide film can be controlled arbitrarily at least by changing temperature of the superultra-pure water and time period of dipping. Since this process is easier to control than the oxidation process using furnace, it can form a very thin oxide film of high quality uniformly. For example, if Si wafer is contacted with a superultra-pure water having a temperature of 45° C. for 20 minutes, an oxidation film of 10 Å can be formed. If Si wafer is contacted with a superultra-pure water having a temperature of 80° C. for 30 minutes, an oxide film of 40 to 50 Å can be formed.

Figure 14:
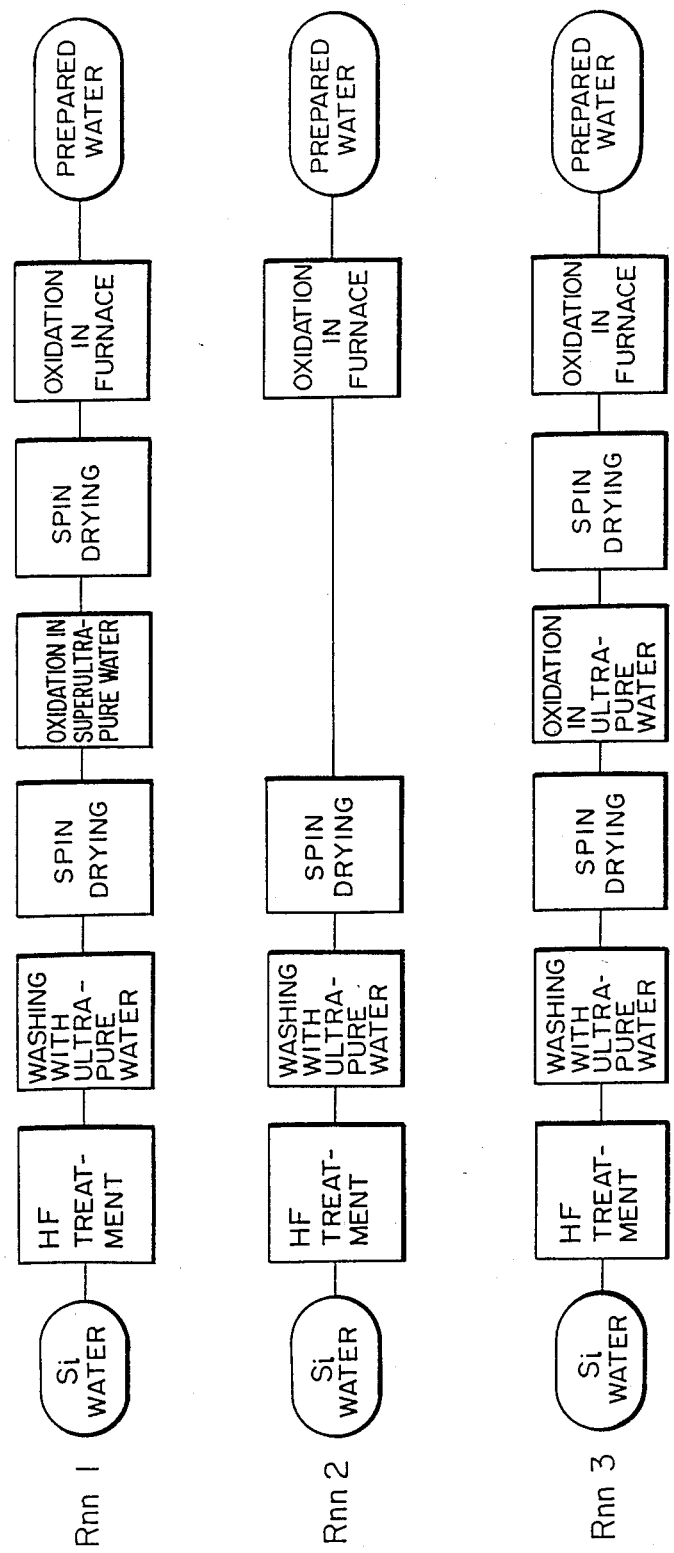
FIG. 14 is a flow diagram illustrating the oxidation of Si wafer.

FIG. 14 illustrates the process for preparing a wafer for evaluating the quality of oxide film. The process of Run 1 is a process according to the present invention. Thus, after treating Si wafer with HF, it is washed with ultra-pure water and the water on the wafer is removed with spin drier, after which wafer is oxidized by dipping it in a superultra-pure water having a temperature of 80° C. for 30 minutes (this is one example of the present invention). Then, the water on the wafer is removed with spin drier and the wafer is oxidized in furnace. The process of Run 3 is different from that of Run 1 in that oxidation is carried out in an ultra-pure water instead of superultra-pure water, though the conditions of the oxidation are identical (dipping at 80° C. for 30 minutes). The process of Run 2 corresponds to the existing process which lacks the step of oxidation in water. In all these three processes, the condition of HF treatment is "dipping in 10% HF for 30 seconds", and the condition of washing with ultra-pure water is "15 minutes with flowing water", and the time of drying with spin drier is 4 minutes, and the conditions of oxidation in furnace are "at 850° C. for 33 minutes", which are all identical throughout the processes.

Figure 15:
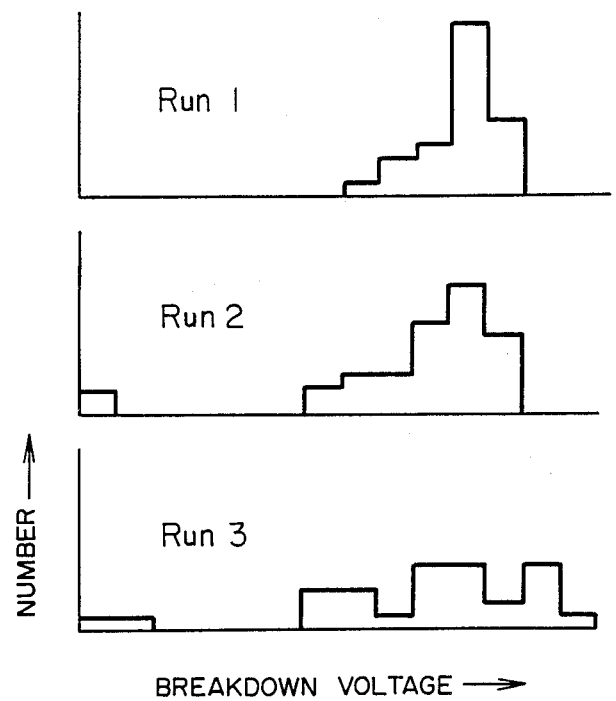
FIG. 15 is a graph illustrating the result of breakdown voltage test of oxidized wafer.

FIG. 15 illustrates the result of breakdown voltage performance test on the wafers having oxide films formed by Runs 1 to 3 of FIG. 14. The measurement was carried out on approximately 300 points, and thickness of oxide film was 200 Å. The result demonstrates that preparation of wafer according to Run 1 is best, because it produced no defective sample.

Figure 16:
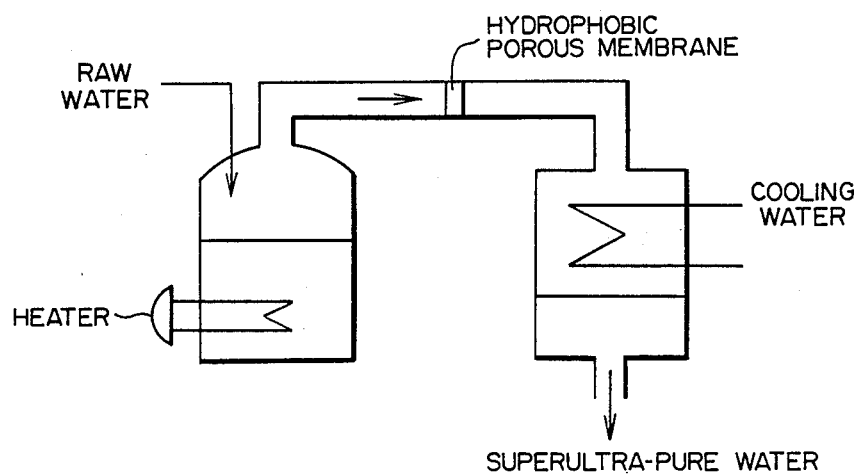
FIG. 16 is an outlined diagram illustrating one process for producing superultra-pure water.
Figure 17:
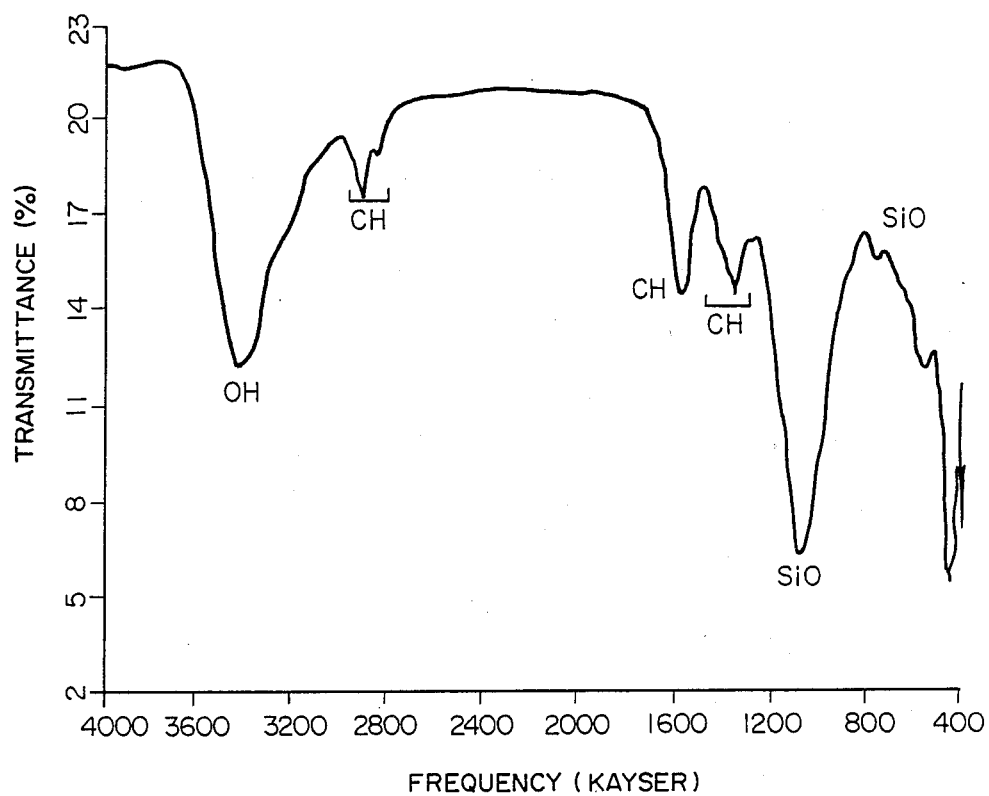
FIG. 17 is a graph illustrating the IR analysis of water mark remaining in the ordinary temperature-drying of superultra-pure water.

The superultra-pure water can be produced according to the process shown in FIG. 16. Thus, it can be produced by heating a raw water to generate steam, making the steam permeate a hydrophobic porous membrane and condensing it.

EFFECT OF THE INVENTION

According to the present invention, an oxide film having a very small thickness (several to several tens angstroms) and a good quality can be formed. With the improvement in the degree of integration in semiconductors, thickness of oxide film must be more decreased hereafter, and the present invention can cope with this trend.

(4) EXAMPLE 7

Figure 18:
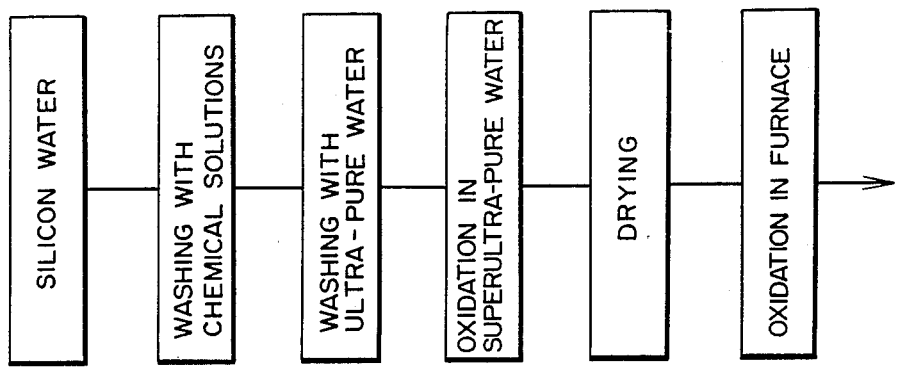
FIG. 18 is a process block diagram illustrating the first example of the invention.
Figure 22:
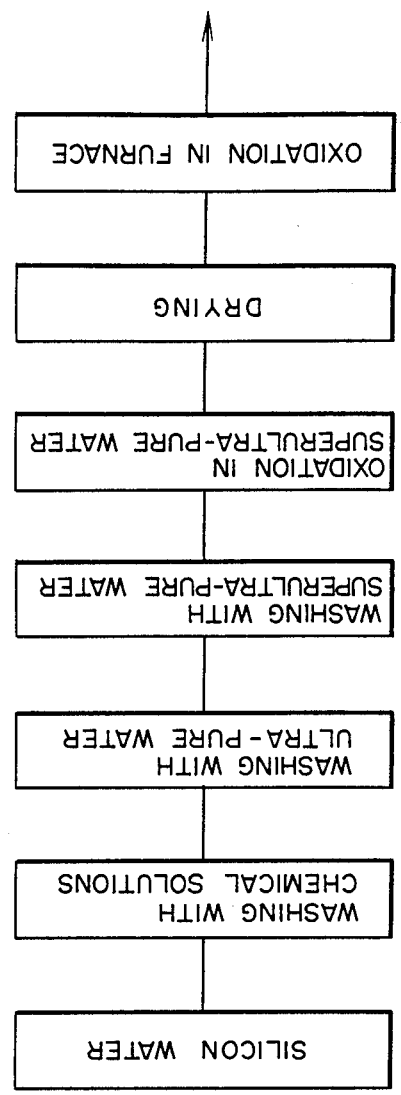
FIG. 22 is a process block diagram illustrating the third example of the invention.

FIG. 18 is a flow diagram illustrating the washing of silicon wafer and formation of oxide film according to the present invention. First, a silicon wafer substrate is washed with chemical solutions in order to remove the surface pollutions and natural oxide film. Then, the chemical solutions used above are washed away with an ultra-pure water, after which the wafer is oxidized with a fresh superultra-pure water in water. After forming an oxide film having a thickness of about 10 to 40 Å, the wafer is dried by the method of spin drying, IPA vapor drying or steam drying and then oxidized in a furnace. In this process, the surface of silicon wafer keeps hydrophilic during the period from the washing step to the drying step and further to the oxidation step, so that its pollution can be prevented to a considerable extent as compared with the case of prior process where the wafer surface was hydrophobic. The superultra-pure water herein under is a water prepared by passing steam through a hydrophobic porous membrane and then condensing it. Since this process is accompanied by a phase change, the cost of water thus produced is necessarily high. In order to reduce the cost of process, there may be another process shown in FIG. 22 where prior inexpensive ultra-pure water is used for removing the chemical solutions and a superultra-pure water prepared by passing steam through hydrophobic porous membrane and condensing the steam is used in the subsequent steps of washing and oxidation in water.

EXAMPLE 8

Figure 19:
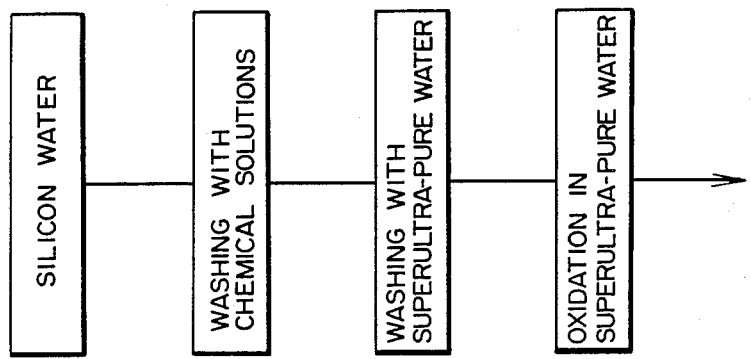
FIG. 19 is a process block diagram illustrating the second example of the invention.

FIG. 19 is another example of the process for washing silicon wafer and forming oxide film according to the present invention. According to this process, the impurities on the wafer surface are removed with chemical solutions and the chemical solutions are washed with ultra-pure water, after which an oxide film necessary for production of semiconductor is formed in a superultra-pure water, so that oxidation furnace is unnecessary unlike the prior processes. According to the present process, the steps of washing and oxidation can be carried out simultaneously, owing to which transportation between steps is unnecessary and pollution is prevented. Further, the velocity of oxidation is not high, so that thickness of film can be controlled easily.

EXAMPLE 9

Figure 20:
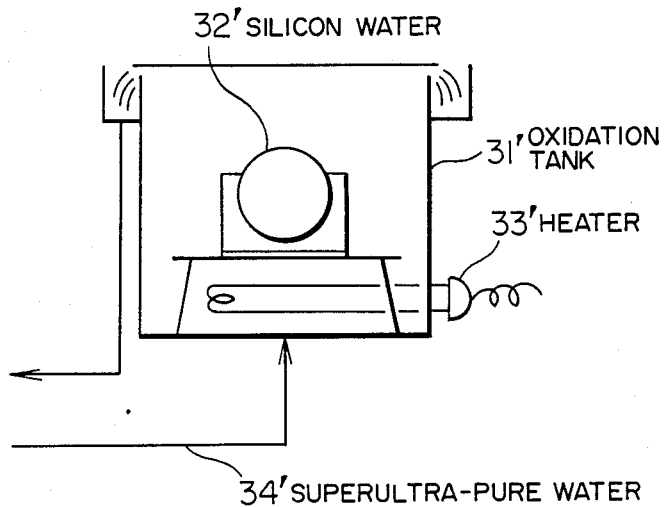
FIG. 20 is a sectional view of the in-water oxidation film-forming tank of the invention.

FIG. 20 illustrates one example of the in-water oxidation film forming tank according to the present invention. Oxide tank 31' is composed of an insoluble material such as quartz glass, and superultra-pure water 34 is sent from the bottom of oxidation tank and made to overflow. Oxidation tank 31 is equipped with heater 33' for the sake of water temperature control, and silicon wafer 32' is completely dipped.

EXAMPLE 10

Figure 21:
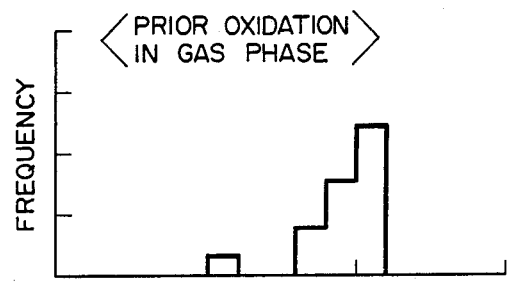
FIG. 21 (a), (b) and (c) are voltage-withstand characteristic graphs of the oxide films of silicon wafer producing according to the process of FIG. 1.
Figure 21:
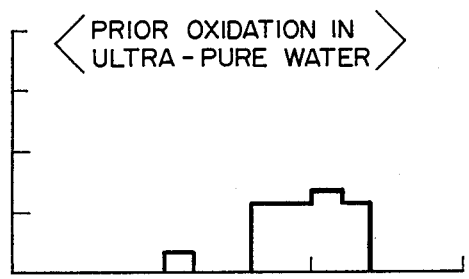
Figure 21:
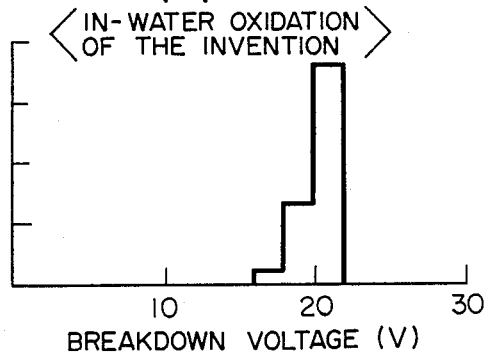

In FIG. 21, the voltage-withstand performance of the oxide film having a thickness of about 200 Å, prepared according to the process of FIG. 18, is compared with that of a prior sample prepared without in-water oxidation and another prior sample prepared by in-water oxidation using prior ultra-pure water. The sample prepared by the process of the invention is comparable in the performance to the other samples prepared by prior methods. This demonstrates the high quality of the oxide film of the invention.

EXAMPLE 11

Figure 23:
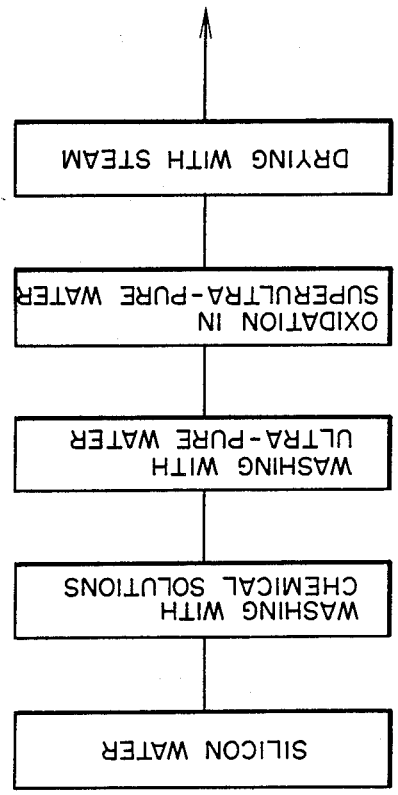
FIG. 23 is a process block diagram of the fourth example which is a further advanced example of the system of the invention.

FIG. 23 illustrates one example which is a further advanced example of the system of the invention. After the washing with chemical solutions, the silicon wafer is washed with ultra-pure water and then washed and oxidized in superultra-pure water. Subsequently, it is dried by the use of a steam having passed hydrophobic porous membrane. According to this process, washing and oxidation can be carried out in one tank, so that external pollutions can be prevented. Further, owing to the drying process using steam, drying can be carried out without contamination by external impurities.

Next, water quality of the superultra-pure water will be explained below.

Table 1 illustrates the water qualities of a superultra-pure water prepared by condensing a steam having passed through hydrophobic porous membrane and a prior ultra-pure water. The hydrophobic porous membrane used herein is a porous PTFE membrane having a pore size of 0.2 μm, and the boiling is carried out under ordinary pressure (at 100° C.).

TABLE 1

| Item | Water qualities of superultra-pure water and ultra-pure water | |
|---|---|---|
| | Superultra-pure water | Ultra-pure water |
| Specific resistance (MΩ · cm) | 18 or above | 18 or above |
| TOC (ppb) | 20 | 50 or below |
| Fine particles (number/ml) | 12 (0.1 μm or above) | 50 (0.1 μm or above) |
| Alive microorganisms (number/ml) | Undetectable | 0.25 |

As the raw water in the production of the superultra-pure water, a reverse osmotic membrane-treated water was used. It is apparent from Table 1 that the superultra-pure water has a considerably good water quality. Then, one drop of the superultra-pure water was dropped onto silicon wafer and dried, and the residue (water mark) was examined. Particularly when the wafer was dried at 100° C., no water mark was observed, demonstrating that nonvolatile impurities (metal ions, etc.) had been removed completely, and the water was a water mark-free superultra-pure water.

EFFECT OF THE INVENTION

According to the present invention, steam is passed through hydrophobic porous membrane to remove the accompanying mist containing metallic components, and the condensed water prepared therefrom contains no metallic components exercising an adverse influence on semiconductors. Since semiconductor wafer is oxidized with this condensed water, the formed oxide film contains no metallic components and has a high quality.

(5) EXAMPLE 12

Figure 24:
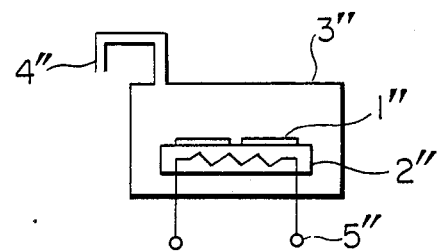
FIG. 24 is a diagram illustrating one example of the practice of the invention.

FIG. 24 is a diagram illustrating the construction of one example of the invention, wherein substrate 1″ is placed on heat transfer plate 2″ provided in container 3″, and said heat transfer plate 2″ is heated by heating element 5″. Container 3″ is provided with an exhaust hole 4″ on its one terminal. The inner atmosphere of the container is kept clean. By heating heat transfer plate 2″, heat is transferred to substrate 1 which is just after being washed with ultra-pure water and has adherent water drops, whereby the water is vaporized and dried up. Here, the surface temperature of heating element 5″ is detected, and it is controlled so as to fulfill the above-mentioned temperature condition. In accordance with the temperature condition, a sucking apparatus or a throttling mechanism is connected to the exhaust hole 4″ in order to keep the inner pressure of container constant.

Figure 25:
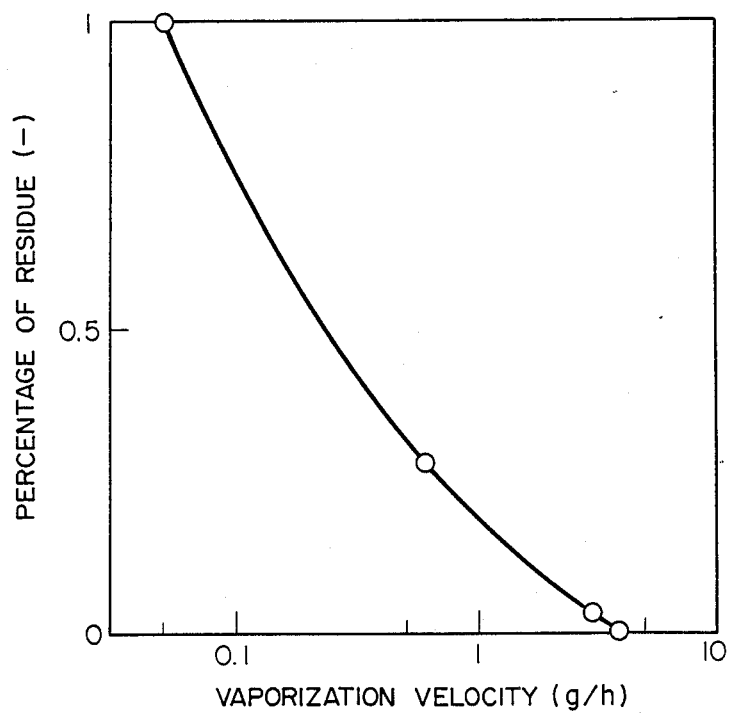
FIG. 25 is a graph illustrating the percentage of residue on substrate surface after practice of the drying process of the invention using ultra-pure water.

In the experiment of FIG. 25, ultra-pure water was dropped onto semiconductor wafer and dried according to the construction of practice of the invention shown in FIG. 24, and FIG. 25 illustrates the relation between vaporization velocity of adhering water and the percentage of residual deposit held on the wafer surface. Thus, about 0.1 g of ultra-pure water (TOC 10 ppb) was dropped onto wafer surface under atmospheric pressure and the water was subjected to a vaporization treatment, taking the case of no heating as a standard. Though in the case of no heating the vaporization velocity was somewhat enhanced by the use of a drying material, it corresponded to a case of natural drying because the temperature was ordinary temperature. The results shown in the figure demonstrate that residual deposit was successively lost on the surface as vaporization velocity was increased by elevating the temperature of heating. The microscopic photographs revealed the following facts. Thus, in the case corresponding to natural drying, the existence of residual substance was clearly observed on the substrate. In the cases when the vaporization velocity was kept at about 0.6 g/hour and about 0.3 g/hour, a slight quantity of residual substance was observed. When the vaporization velocity was 4 g/hour or above, no residual substance was observed at all, and the wafer surface could be dried without pollution. In the last case, the temperature was about 100° C. This means that the dissolved substance in the ultra-pure water is a mixture mainly composed of organic substances of which boiling points are in the neighborhood of 100° C. Based on this result, a substrate can be washed with such an ultra-pure water and dried and then sent into the subsequent step according to the present invention.

EFFECT OF THE INVENTION

According to the present invention.

(1) in succession to the washing of substrate with ultra-pure water, the water adhering to the substrate can be dried up without forming deposits and the substrate can be sent into the subsequent step of the production process while keeping clean the substrate surface, and (2) the wafer surface can be dried without deposition of the contaminative substances, particularly low-boiling organic substances, entering the ultra-pure water in the form of volatile matter in the process of production of the ultra-pure water, i.e. in the process of distillation/membrane distillation.

Based on above, here is provided a washing and drying means successfully applicable to the production processes of semiconductors such as semiconductor wafer, optical disks and the like, and various optical and electronic parts.

What is claimed is:

1. A process for producing ultra-pure water which comprises boiling raw water to vaporize off volatile components from the raw water, subsequently generating steam from the boiled water from which said volatile components have previously been removed, contacting the steam with a hydrophobic, porous, gas-permeable and liquid-impermeable membrane to make the steam permeate the membrane and removing liquid mist sufficient to produce a high purity steam substantially free of impurities, and then condensing the steam to form ultra-pure water.

2. A process for producing ultra-pure water which comprises boiling raw water to vaporize off volatile components from the raw water, subsequently generating steam from the boiled water from which said volatile components have previously been removed, contacting the steam with a hydrophobic, porous, gas-permeable and liquid-impermeable membrane to make the steam permeate the membrane and removing liquid mist sufficient to produce a high purity steam substantially free of impurities, leading the steam having permeated the membrane into an atmosphere of saturated steam or inert gas, and condensing the steam in said atmosphere to form ultra-pure water.

3. A process for producing ultra-pure water by generating steam from raw water, making the steam permeate a hydrophobic, porous, gas-permeable and liquid-impermeable membrane removing liquid mist sufficient to produce high purity steam substantially free of impurities, and then condensing the steam, which comprises a step for heating and boiling the raw water to vaporize off volatile components and a step for generating steam from the raw water from which said volatile components been removed by having completed the preceding step and contacting the steam with said hydrophobic porous membrane to form ultra-pure water.

4. A process for producing ultra-pure water by generating steam from raw water, making the steam permeate a hydrophobic, porous, gas-permeable and liquid impermeable membrane removing liquid mist sufficient to produce high purity steam substantially free of impurities, and then condensing the steam; which comprises a step for boiling the raw water to vaporize off volatile components while keeping the raw water under a reduced pressure and a step for generating steam from the raw water from which said volatile components have been removed by having completed the preceding step and contacting the steam with said hydrophobic porous membrane to form ultra-pure water.

5. A process for producing ultra-pure water which comprises boiling a raw water containing volatile components and nonvolatile components to vaporize off the volatile components, subsequently generating steam from the boiled raw water from which said volatile components have previously been removed, contacting only the steam with a hydrophobic, porous, gas-permeable and liquid-impermeable membrane to make the steam permeate the membrane and removing liquid mist sufficient to produce a high purity steam substantially free of impurities, and then condensing the steam to form ultra-pure water.

6. A process for producing ultra-pure water which comprises boiling a raw water containing volatile components and nonvolatile components to vaporize off the volatile components, subsequently heating the boiled raw water from which said volatile components have previously been removed to generate steam, contacting only the steam with a hydrophobic, porous, gas-permeable and liquid-impermeable membrane to make the steam permeate the membrane and removing liquid mist sufficient to produce a high purity steam substantially free of impurities, leading the steam having permeated the membrane into an atmosphere of saturated steam or inert gas, and condensing the steam in said atmosphere to form ultra-pure water.

7. A process for producing ultra-pure water which comprises heating a raw water containing volatile and volatile and nonvolatile components to vaporize off the volatile components, subsequently again heating the raw water from which said volatile components have previously been removed to generate steam, contacting only the steam with a hydrophobic porous gas-permeable and liquid-impermeable membrane to make the steam permeate the membrane and removing liquid mist sufficient to produce a high purity steam substantially free of impurities, and then condensing the steam to provide ultra-pure water to form ultra-pure water.

8. A process for producing ultra-pure water which comprises heating and boiling a raw water containing volatile components and nonvolatile components to vaporize off the volatile components, subsequently again heating the raw water from which said volatile components have previously been removed to generate steam, contacting only the steam with a hydrophobic, porous, gas-permeable and liquid permeable membrane to make the steam permeate the membrane and removing liquid mist sufficient to produce a high purity steam substantially free of impurities, leading the steam having permeated the membrane into an atmosphere of saturated steam or inert gas, and then condensing the steam in said atmosphere to form ultra-pure water.

9. A process for producing ultra-pure water which comprises a step for heating and boiling a raw water containing volatile components and nonvolatile components to vaporize off the volatile components and a subsequent step for again heating the raw water from which said volatile components have previously been removed to generate steam by using a steam containing the vaporized volatile components obtained in the preceding step as a heat source, contacting only the generated steam with a hydrophobic, porous, gas-permeable and liquid impermeable membrane to make the steam permeate the membrane and removing liquid mist sufficient to produce a high purity steam substantially free of impurities and then condensing the steam to form ultra-pure water.

10. A process for producing ultra-pure water which comprises a step for heating and boiling a raw water containing volatile components and nonvolatile components to vaporize off the volatile components and a subsequent step for again heating the raw water from which said volatile components have previously been removed to generate steam by using a steam containing the vaporized volatile components formed in the preceding step as a heat source, contacting only the generated steam with a hydrophobic, porous, gas-permeable and liquid impermeable membrane to make the steam permeate the membrane and removing liquid mist sufficient to produce a high purity steam substantially free of impurities, leading the steam having permeated the membrane into an atmosphere of saturated steam or inert gas and condensing the steam in said atmosphere to form ultra-pure water.

11. A process for producing ultra-pure water which comprises generating steam from a raw water previously freed of volatile components by heating outside of a clean room for isolating the used point of ultra-pure water of the outer atmosphere, subsequently transporting the generated steam into the clean room in a gaseous state and condensing it by means of a condenser provided in the neighborhood of the used point and equipped with a hydrophobic porous membrane for removing liquid mist from said steam to provide ultra-pure water.

12. A process for producing ultra-pure water according to claim 11, wherein steam is generated from raw water after removing carbon dioxide gas and organic substances from the raw water.

13. A process for producing ultra-pure water comprising:
   heating raw water containing impurities to vaporize off volatile components from the raw water;
   heating the raw water from which the volatile components have previously been removed to generate steam;
   passing said steam through a hydrophobic porous membrane to remove water droplets from said steam, and to produce high purity steam being substantially free of said impurities; and
   condensing said high purity steam to obtain ultra-pure water.

14. A process according to claim 13, wherein said step of condensing is carried out in an atmosphere of saturated steam or inert gas.

15. A process according to claim 13, wherein said ultra-pure water has a specific resistance of 18 M$\Omega$-cm or above, fine particles with a size of 0.1 $\mu$m or more in an amount of 100 particles/liter or, less, 10 microorganisms/liter or less, and 10 ppb or less of organic substances.

* * * * *